United States Patent [19]
Bronicki

[11] Patent Number: 5,317,904
[45] Date of Patent: Jun. 7, 1994

[54] METHOD OF AND APPARATUS FOR CONDITIONING AIR

[75] Inventor: Lucien Y. Bronicki, Yavne, Israel
[73] Assignee: 4E Co., Seattle, Wash.
[21] Appl. No.: 3,878
[22] Filed: Jan. 12, 1993

Related U.S. Application Data

[63] Continuation of Ser. No. 800,714, Dec. 3, 1991, abandoned, which is a continuation of Ser. No. 441,645, Nov. 27, 1989, abandoned.

[51] Int. Cl.⁵ ............................................. F25B 9/00
[52] U.S. Cl. ........................................ 62/87; 60/659; 62/401
[58] Field of Search ................. 62/87, 401; 60/659

[56] References Cited

U.S. PATENT DOCUMENTS

| 257,506 | 5/1882 | McMillan et al. |
| 465,298 | 12/1891 | Timby ........................ 165/48.1 |
| 654,264 | 7/1900 | Lueder et al. |
| 1,595,779 | 8/1926 | Hartzell |
| 2,077,315 | 4/1937 | Ewing et al. .................. 62/88 |
| 4,100,745 | 7/1978 | Gyarmathy et al. .......... 60/659 |
| 4,237,692 | 12/1980 | Ahrens ........................... 60/659 |
| 4,444,024 | 4/1984 | McFee ........................... 62/401 |
| 4,765,142 | 8/1988 | Nakhamkin .................... 60/659 |

FOREIGN PATENT DOCUMENTS 2054831 2/1981 United Kingdom .

OTHER PUBLICATIONS

Compressed Air Storage-A Peak-Shaving Concept For Electrical Utilities.

*Primary Examiner*—Ronald C. Capossela
*Attorney, Agent, or Firm*—Sandler Greenblum & Bernstein

[57] ABSTRACT

Air is conditioned by compressing air at a first location during a first interval of time and storing the compressed air at the first location. Compressed air stored at the first location is transported by pipeline to a second location remote from the first location during a second interval of time different from the first interval of time and expanded at the second location. The expanded air is delivered to enclosures at the second location. The first interval of time is preferably during the night when the power required to compress the air is relatively inexpensive.

53 Claims, 3 Drawing Sheets

METHOD OF AND APPARATUS FOR CONDITIONING AIR

This application is a continuation of application Ser. No 07/800,714, filed Dec. 3, 1991, now abandoned; which is a continuation of application Ser. No. 07/441,645, filed Nov. 27, 1989, now abandoned.

TECHNICAL FIELD

This invention relates to a method of and apparatus for conditioning air, and more particularly to providing clean air from a remote rural location to an urban location.

BACKGROUND OF THE INVENTION

Pollution in many large industrial cities in the world is rapidly reaching critical proportions. In Tokyo, for example, oxygen "bars" have been opened to provide urban dwellers with whiffs of oxygen as a respite from local pollution. As an alternative, clean air from a remote rural area could be piped into buildings in urban areas to provide fresh country air to the workers of the building. This approach is suggested in GB 2054831 which discloses a system for piping clean, cool air from a mountain to an urban region at sea level, or for piping hot air from sea level to a remote area in the mountains.

The basic problem with this approach is the cost in transporting large masses of air from one geographic location to another. To the very high capital cost of constructing conduits between the locations, and the cost of distributing the air within the city, must be added the operational costs for piping the air.

U.S. Pat. No. 465,298 discloses apparatus for conditioning air in houses by delivering air drawn into a stack at one location by a fan to a manifold connected to various houses, the air being filtered and moistened, heated or cooled, as required. Part of the air is compressed and stored, if desirable, producing a higher pressure for portions of the delivered air. Even so, the operational and construction costs of this approach are high.

It is an object of the present invention to provide a new and improved method of and apparatus for piping clean air from a remote rural location to an urban location, in a manner that is more cost effective and efficient than previously known.

DESCRIPTION OF THE INVENTION

According to the present invention, air is conditioned by compressing air in a first location. The air, preferably stored at the first location, is transferred to a second location. The compressing and storing of air is preferably carried out during a first interval of time with the air being transferred to a second location, preferably during a second interval of time different from the first interval of time. At the second location, the air is expanded and then delivered to one or more enclosures at the second location. Preferably, the second location is remote from the first location. The energy released during expansion can also be used to produce electricity.

The compression of the air at the remote location reduces the volume of air that must be transported by pipeline between the first location and the second location, and thus reduces construction costs of a system based on the present invention. Moreover, when the first interval of time is at night, when off-peak electrical power is readily available and relatively inexpensive, the cost of compressing the air is considerably reduced. Moreover, some of the energy required for the compression operation can be recovered by extracting heat from the compressed air and using the heat to operate a turbogenerator. Furthermore, additional recovery of energy can be made when the energy released during expansion is used to produce electricity. Such energy recovery is particularly cost efficient when expansion and consequent electricity production is carried out during periods of peak electricity demand, as the value of generated electric power is greater at such times.

Apparatus according to the present invention for conditioning air may thus include compressor means for compressing air, storage means at a first location for storing air compressed by the compressor means, and expander means at a second location, preferably remote from the first location, for expanding compressed air. A pipeline may be provided for transferring air from the storage means to the expander means. Optional control means are constructed and arranged so as to effect the operation of the compressor means and to prevent operation of the expander means during a first interval of time, and to effect operation of the expander means and to prevent operation of the compressor means during a second interval of time different from the first interval. Utilization means are provided at the second location for receiving expanded, compressed air from the expander means.

The present invention thus provides economical means capable of transporting clean air over great distances by reducing the volume of the air and recovering energy when the air is expanded at it place of use.

BRIEF DESCRIPTION OF THE DRAWINGS

Embodiments of the present invention are shown by way of example in the accompanying drawings wherein.

DETAILED DESCRIPTION

Figure 1:
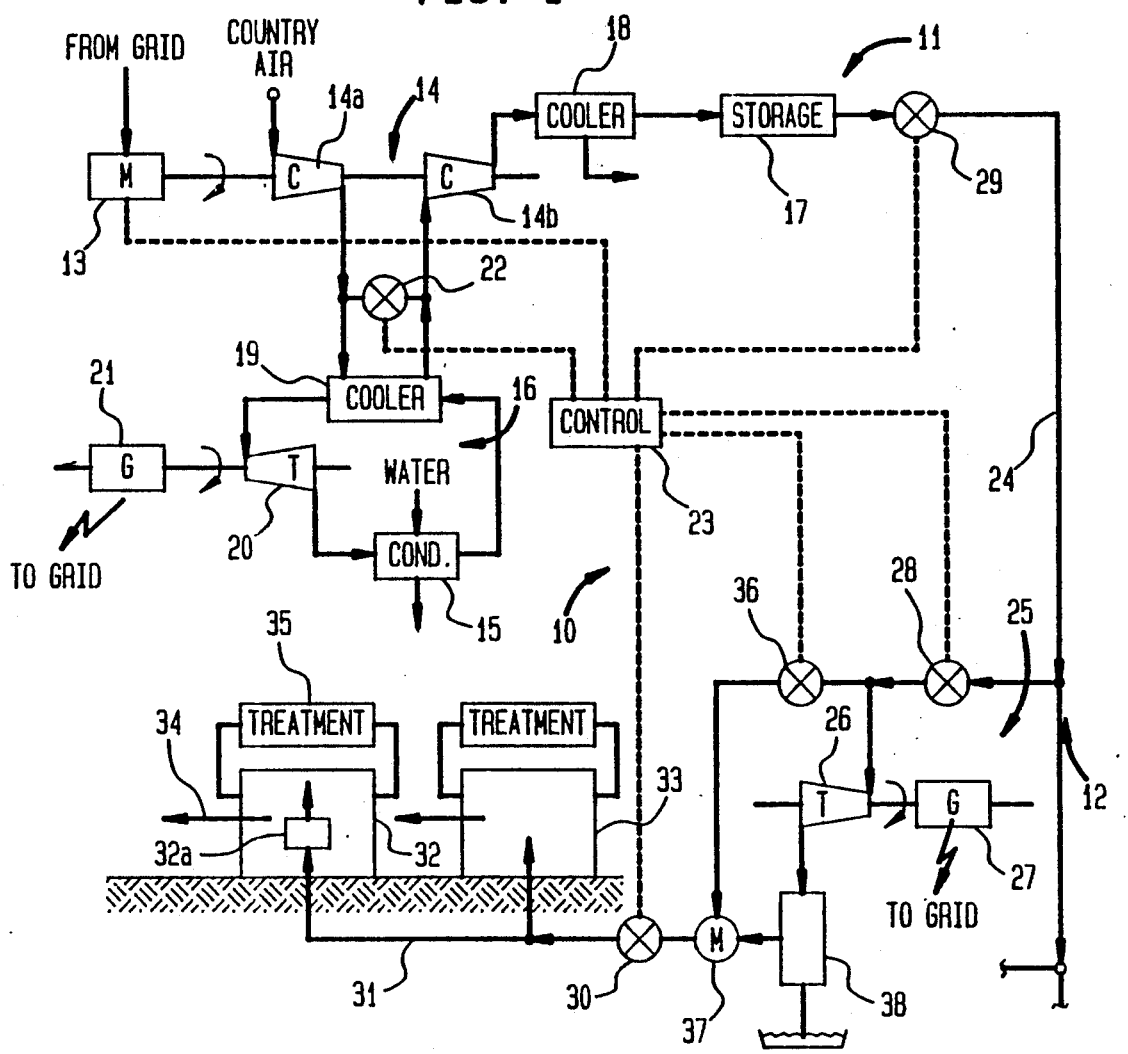
FIG. 1 is a schematic block diagram of the present invention.

Referring now to FIG. 1, reference numeral 10 designates apparatus according to the present invention for providing clean rural air from a remote rural location 11 to urban location 12. A compressor station at rural location 11 includes electric motor 13 that operates from a local electrical grid for the purpose of driving compressor means 14 having low pressure stage 14a and high pressure stage 14b. Rural air is drawn into the low pressure stage 14a when motor 13 is operated and is compressed thereby. The low pressure stage produces compressed air that is passed through heat exchanger means 16 before being delivered to high pressure compressor stage 14b. In the latter, the air is further compressed and delivered to storage tank 17 through heat exchanger 18.

Heat exchanger 16 and 18 are similar and each comprises cooler 19 within which heat from the compressed air is extracted and transferred to a working fluid, preferably an organic fluid which has little or no potential of bringing about damage to the ozone layer. The organic fluid is vaporized in the cooler and supplied to an organic fluid Rankine cycle turbine 20 coupled to generator 21. The vaporized working fluid expands in turbine 20; and some of the heat contained in the working fluid is converted into electrical power by generator 21. The heat depleted working fluid exhausted from turbine 20 is supplied to water-cooled condenser 21 wherein the vapor is condensed to a liquid which is returned to cooler 19 to complete the cycle.

The degree of interstage cooling is determined by the setting of valve 22 connecting the low pressure stage of the compressor means to the high pressure stages. The setting of this valve may be established by control 23 as described below.

While the drawing shows interstage and afterstage cooling of the compressed air connected to a Rankine cycle turbine, any other cooling arrangement consistent with the type of compressor being would be satisfactory. The ultimate goal is to store the compressed air in storage tank 17. While the storage is indicated as being in a tank, other types of storage means are also possible. For example, underground storage in abandoned caverns is also feasible. Optionally, the heat extracted from the compressed air may be stored for later use in a heat store such as a salt water solar pond, molten salts, or rocks for recovery at a later time. For example, the heat may be stored at night when compression takes place, and used during the day to generate electricity when the value of the power generated is greater.

If necessary, or desirable, the level of moisture in the air stored at the remote location can be controlled. The can be achieved passing the air to be compressed through a suitable dehumifier such as a brine shower.

Compressed air in storage tank 17 at remote location 11 is transferred to urban location 12 via pipeline 24 in accordance with the setting of valve 29 operated by control means 23. At urban location 12, one or more expander stations 25 are connected to the pipeline, each station being in the form of a turbogenerator that includes air turbine 26 coupled to electrical generator 27. If valve 29 at the compressor station is open, and valve 28 in the expander station is open, compressed air from tank 17 flows via pipeline 24 into turbine 26 where the controlled expansion of the air drives generator 27, the output of which is connected to the electrical grid. Air exhausted from turbine 26 passes through open valve 30 into manifold 31 which feeds a number of buildings 32, 33. That is to say, manifold 31 is connected to the duct work in each of the buildings thereby supplying the buildings with air that originated at remote location 11. A predetermined percentage of air inputted to the buildings is exhausted at 34, while the remaining air in the building is recirculated through treatment apparatus 35 wherein contaminants are removed in a conventional manner. Such contaminants may be smoke as well as carbon dioxide. In addition to controlling contaminants, the humidity level in the air can also be controlled. Air exhausted at 34 can be directed at a level suitable for supplying relatively clean air to people present outside the buildings.

Finally, the invention also includes control means 23 the purpose of which is to control the time of operation of the remainder of the components making up the invention. In the preferred embodiment, the control means is constructed and arranged so as to effect operation of compressor means 14 at the compressor station, and to prevent operation of expander station 25 during a first interval of time, preferable the night. During this period of time, the power grid will have excess capacity available with the result that the cost of electricity during this period of time is less than during the day. Consequently, the cost of compressing the air supply to tank 17 is reduced as compared to daytime operation of motor 13. Also, during the night, buildings 32, 33 are generally not occupied or not heavily used with the result that the need for fresh air is significantly reduced as compared to the daylight hours.

Control means 23 is further constructed and arranged to effect operation of expander station 25 and to prevent operation of compressor means 14 during a second interval of time different from the first interval of time. Preferably, the second interval of time is the daylight period. In this manner, fresh air from the country is compressed at night and stored in storage tank 17 when the cost of electricity is relatively low. Some of the energy used for compressing the air is returned to the electrical grid by reason of heat exchanger means 16 associated with cooling the compressed air.

During the day, when electrical energy is relatively more expensive, control means 23 is effective to operate the system to shut down motor 13 and to initiate operation of expander station 25 so that the air stored in tank 17 is applied to buildings 32, 33. Turbine 26 serves to reduce the relatively high pressure air in pipeline 24 to a value suitable for injection into the air handling system of building 32, 33, and to produce electricity via generator 27. In this manner, some of the energy expended during the night to compress the air is recovered and returned to the electrical grid during the time the electricity is relatively more expensive.

During the summer, the expansion of high pressure air in turbine 26 is accompanied by a marked cooling of the air thereby providing a mass of cooled air to the buildings during a time that will reduce the air conditioning load on the buildings.

In an optional arrangement, bypass valve 36 is connected to the high pressure air in pipeline 24 for the purpose of bleeding high pressure air into mixing chamber 37 which receives air exhausted from turbine 26. In the winter, valve 22 and other suitable means may be used to reduce the amount of interstage and afterstage cooling, and valve 36 may be opened by control means 23 in order to increase the temperature of the air entering manifold 31 by mixing the high pressure air with cool air exhausted from turbine 26. This will warm the air exhausted from the turbine. Furthermore, mixing chamber 37 can be used in summer, if preferred, to produce conditioned air of a suitable temperature wherein cold air exiting turbine 26 is directly mixed with other air, for example, air present in the buildings. Furthermore, cold air exiting turbine 26 can first of all be used in a "cold trap", or dehumidifying means 38, for dehydrating air used in conditioning the buildings, and also collecting vapors and odors present in this air. This is particularly useful when the air present in the buildings is used to condition the buildings. In such case, if preferred, such a cold trap or traps, can be located in treatment apparatus 35. The use of cold air can also be made in treatment apparatus 35 to improve the removal of $CO_2$, etc. Also, such cold air can be used in cooling cold storage facilities 32a containing, for example, meat, fruits, etc. This use may be prior to producing conditioned air for conditioning the remainder of the buildings. Such heating and cooling systems can be incorporated if preferred and where suitable, into conventional air-conditioning systems.

Figure 1A:
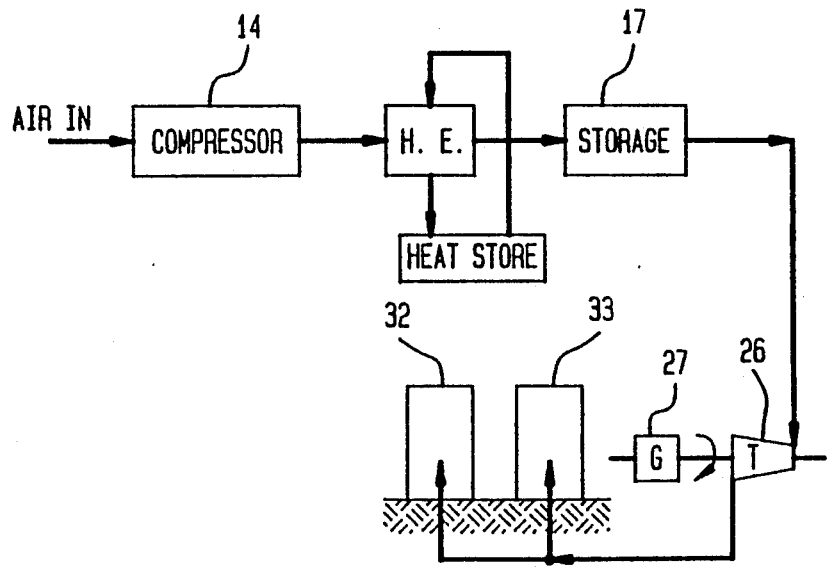
FIG. 1A is a further embodiment of the present invention.

In a further embodiment of the present invention shown in FIG. 1A, the compressor and storage facilities (if needed) shown in FIG. 1 can be located in the vicinity of the buildings to be served. Here, once again, as in the preferred embodiment, the compressor may be operated during periods of off-peak demand for electricity when the cost of its heat (if necessary) being stored during this period of time in an on-site storage tank and heat store. During periods of peak demand for electricity, the expander, coupled to an electrical generator, would be operated to produce cooling and/or heat and electricity.

In summary, reference numeral 14 designates compressor means for compressing air, and storage tank 17 represents storage means at a first location for storing air compressed by the compressor means. Reference numeral 25 represents expander means at a second location preferably remote from the first location for expanding the compressed air. Reference numeral 24 represents pipelines means for transferring air from the storage means to the expander means. Finally, control 23 represents control means constructed and arranged so as to effect operation of the compressor means and to prevent operation of the expander means during a first interval of time, and to effect operation of the expander means and to prevent operation of the compressor means during a second interval of time different from the first interval of time. Finally, building 32 and 33 represent utilization means for receiving expanded air from the expander means.

Figure 2:
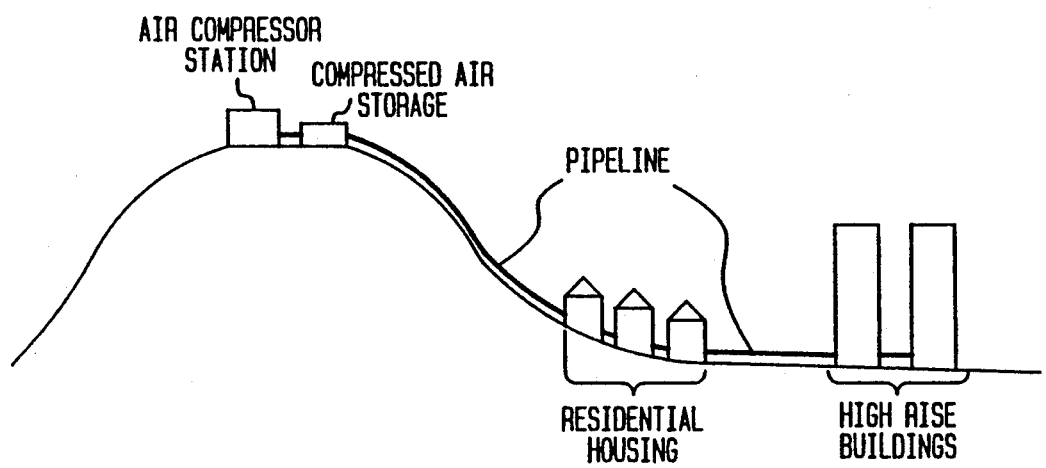
FIG. 2 is another embodiment of the present invention.

As indicated above, the invention is particularly useful for conditioning the air in high rise buildings both during the summer and winter. As indicated in FIG. 2, the air compressor station can be located in a remote rural area where the air is not polluted, and sent by pipeline to residential housing as well as high rise office buildings located at a distance from the air compressor station.

Figure 3:
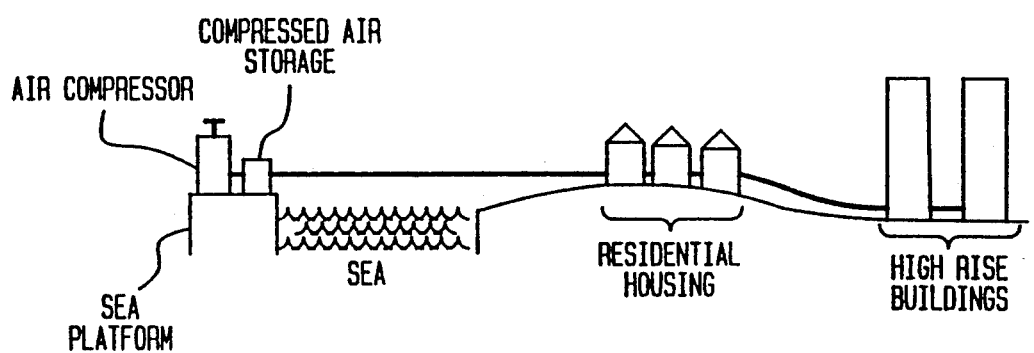
FIG. 3 is a further embodiment of the present invention.

In an alternative arrangement, the air compressor station may be located at sea and the compressed air piped to shore to both residential and high rise office buildings as indicated in FIG. 3.

Figure 4:
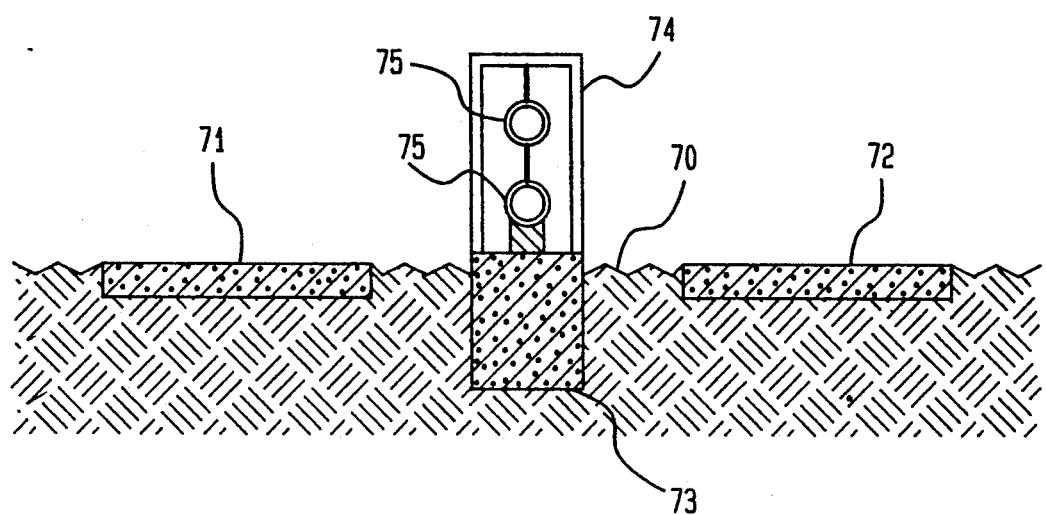
FIG. 4 is a sectional view through a road connecting a rural area with an urban area for the purpose of illustrating the utilization of the road right-of-way for an air pipeline.
Figure 4A:
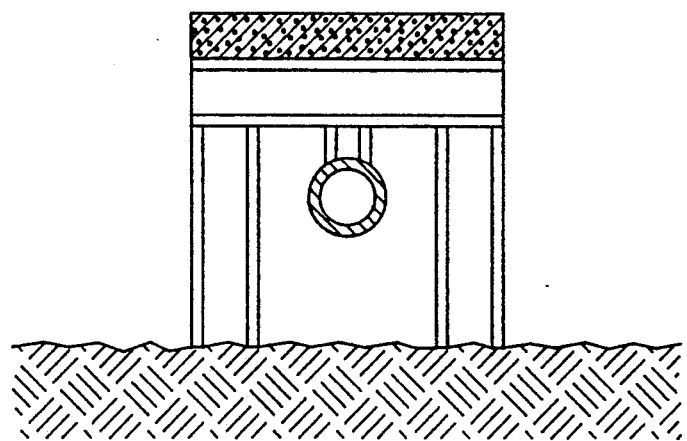
FIG. 4A is a sectional view though an elevated road, such as a bridge, illustrating utilization of a right-of-way for an air pipeline.

In order to reduce the cost of construction, the pipeline may be constructed along the right-of-way of a highway connecting a remote compressor station with an urban area to be supplied by the station. FIG. 4 is a schematic representation of a cross-section through a divided highway along which the air pipeline is to run. Mounted in median strip 70 between pavements 71 and 72 of a highway is foundation 73 carrying superstructure 74 for suspending pipelines 75. These pipelines are built to the same standards as conventional natural gas pipelines, and may include booster stations for repressurizing the air. Furthermore, if the highway is elevated, the pipeline can be suspended under the roadway as shown in FIG. 4A.

Technology exists for transporting valuable fluids over large distances. For expensive liquids, such as petroleum products, pipelines are built over hundreds or thousands of miles. The cost of pipeline transportation of liquids is measured in the cost of the pipe and overcoming fluid friction in the pipe. The cost for transporting gases by pipeline includes not only the cost of the pipe and friction losses in the pipe, but also the cost of compressing the gases. However, for valuable gas, such as natural gas, recovery of the compression costs in almost never undertaken.

In a large city like Los Angeles, with mountains ranges 50 to 100 miles away, the customer base may be 1.5 million people in office buildings, shopping centers, factories, etc. The order of magnitude of the fresh air requirements of this customer base is 50,000 tons per day. Using a 75 miles pipeline operating at 70 bars (1000 p.s.i.), about 75,000 KW would be required to provide this service. Based on present cost of about $2.7 million per mile to construct conventional gas pipeline and compression stations, the investment cost of a system like that described above is about $205 million, or about $130 per person. The power cost for compressor operation at night will be compensated for by the recovery of power during the day when its value is significantly greater than at night. The balance of the power cost for this system will be equivalent to or lower than the usual air conditioning systems being used, but this system has the added advantages of ensuring clean air and eliminating the use of conventional refrigeration gases that are ecologically damaging.

The present invention thus provides an alternative approach to all-year air conditioning of buildings in large cities which is both economically and ecologically attractive as compared with conventional approaches. According to the invention, fresh, cool air is supplied to buildings in a city during the day when the buildings are occupied by compressing the air the previous night at a location preferably remote from the city where the air in uncontaminated, and relatively inexpensive off-peak energy is available. The compressed air can be stored temporarily at the remote location, and transported by pipeline to the city during the day when needed. At the pipeline terminus, or at individual buildings, depending on the economics of the design, the compressed air is expanded in turbogenerator apparatus which serves to convert much of the energy used in compression of the air to electricity. This electricity is produced during periods of peak demand when the value of the power produced is greater than the value used to compress the air.

The resultant expansion of the air in the turbogenerator apparatus produces extremely cold air that can be directly added proportionally to the existing air conditioning system in the building. This achieves the introduction of fresh, clean air into the building and provides needed cooling in the summer without the use of the Freons or other conventional refrigeration gases that damage the ozone layer.

Because the air is so cold after its expansion at its destination, the air can be supplied initially, as described above, to cold storage plants, and then routed to the air conditioning systems of buildings to supply clean, fresh air.

By preferably compressing the air at a location remote from customer sin a city, the heat of compression is rejected away from the city, at night resulting in the ability to use more efficient, and larger turbomachinery for compression in the present system for conditioning air compared to conventional air conditioning systems. Furthermore, the central location of the compression equipment simplifies maintenance. Some of the cost of compression of the air can be recovered by extracting heat from the compressed air and using the heat in waste heat power plants. Alternatively, the heat from compression can be stored in salt water solar ponds, molten salts, or rocks and recovered at a later time to generate electricity during the time of peak demand. This alternative arrangement is illustrated in FIG. 1A.

While the embodiments described above disclose the use of storage means for storing compressed air, the present invention also envisages the compression of air in a location with the compressed air being supplied to expander stations (as shown in FIG. 1 or FIG. 1A, for example) for expansion and consequent production of cold or conditioned air as well as electricity without storing the air.

The advantages and improved results furnished by the method and apparatus of the present invention are apparent from the foregoing description of the various embodiments of the invention. Various changes and modifications may be made without departing from the spirit and the scope of the invention as defined in the claims that follow.

I claim:

1. A method for conditioning air comprising the steps of:
   a) compressing air at a first location during a first interval of time;
   b) storing the compressed air at said first location;
   c) transporting air stored at said first location to a second location remote from the first location during a second interval of time different from the first interval of time;
   d) expanding the transported air at said second location;
   e) delivering the expanded air to one or more utilization means at said second location; and
   f) extracting heat from compressed air at the first location and converting some of the extracted heat to electrical power.

2. A method for conditioning air comprising the steps of:
   a) compressing air at a first location during a first interval of time;
   b) storing the compressed air at said first location;
   c) transporting air stored at said first location to a second location remote from the first location during a second interval of time different from the first interval of time;
   d) expanding the transported air at said second location;
   e) delivering the expanded air to one or more utilization means at said second location; and
   f) wherein the expansion of the air at said second location releases energy that is converted into electrical power.

3. Apparatus for conditioning air comprising
   a) compressor means at a first location for compressing air;
   b) storage means for storing air compressed by said compressor means;
   c) expander means at a second location for expanding the compressed air;
   d) pipeline means for transporting air from said storage means to said expander means;
   e) control means constructed and arranged so as to effect operation of said compressor means and to prevent operation of said expander means during a first interval of time, and to effect operation of said expand err means and to prevent operation of said compressor means during a second interval of time different from the first interval of tie; and
   f) utilization means for receiving expanded compressed air from said expander means.

4. Apparatus according to claim 3 wherein said second location is remote from said first location.

5. The apparatus according to claim 4 wherein said compressor means is located at sea.

6. Apparatus according to claim 3 wherein said first interval of time is at night.

7. Apparatus according to claim 4 wherein the first location is rural and the second location is urban.

8. Apparatus according to claim 4 including heat exchanger means operatively associated with said compressor means for extracting heat from the air compressed by the latter.

9. Apparatus according to claim 8 including means responsive to extracted heat for generating electrical power.

10. Apparatus according to claim 9 wherein said last named means includes an organic fluid, Rankine cycle heat engine.

11. Apparatus according to claim 8 including turbogenerator means operatively associated with said heat exchanger means and responsive to heat extracted from the air for generating electrical power.

12. The apparatus according to claim 3 including electrical generator means operatively associated with said expander means for converting energy released by the expansion of the compressed air in the expander means into electrical power.

13. The apparatus according to claim 3 including heat exchanger means operatively associated with said compressor means for extracting heat from the air compressed by the latter; turbogenerator means associated with said heat exchanger means and responsive to heat extracted from the air for generating electrical power; and means operatively associated with said expander means for converting energy released by the expansion of the compressed air in the expander means into electrical power.

14. The apparatus according to claim 3 including means for treating the air in said utilization means in order to reduce the level of $CO_2$ therein.

15. The apparatus according to claim 1 including means for treating the air in said utilization means in order to reduce the level of contaminants therein.

16. A method for conditioning air comprising the steps of:
   a) compressing air at a first location;
   b) transporting the compressed air to a second location;
   c) expanding only the transported air at said second location and using energy released during expansion to produce electricity; and
   d) delivering the expanded air to one or more utilization means at said second location.

17. A method according to claim 16 wherein said second location is remote from said first location.

18. A method according to claim 16 including the step of storing the compressed air.

19. A method according to claim 18 wherein the air is compressed and stored during a first interval of time and transported air is expanded during a second interval of time.

20. A method according to claim 19 wherein said first interval of time is at night.

21. A method according to claim 19 wherein said second interval of time is at night.

22. A method according to claim 16 including the step of storing heat produced during the compression of air.

23. A method according to claim 14 including the step of mixing expanded air with other air.

24. A method according to claim 14 including the step of using said expanded air to dehydrate air.

25. A method according o claim 14 wherein said utilization means includes cold storage facilities.

26. A method according to claim 23 including the step of exhausting air from the buildings at a predetermined elevation.

27. A method according to claim 14 wherein said utilization means includes buildings.

28. A method according to claim 14 including the step of treating the air in said utilization means in order to reduce the level of $CO_2$ therein.

29. A method according to claim 14 including the step of using said expanded air for treating the air from the utilization means in order to reduce the level of odors therein.

30. A method for conditioning air comprising the steps of:
   a) compressing air at a first location;
   b) storing the compressed air;
   c) transporting the stored compressed air to a second location;
   d) expanding only the transported air at the said second location; and
   e) delivering the expanded transported air to a utilization means at said second location.

31. A method according to claim 30 wherein the air is compressed and stored during a first interval of time and transported air is expanded during a second interval of time.

32. A method according o claim 30 wherein the expansion of the air at second location releases energy that is converted into electrical power.

33. A method for conditioning air comprising the steps of:
   a) compressing air at a first location;
   b) transporting the compressed air to a second location;
   d) expanding the transported air at the said second location for producing energy, and using said energy for producing electricity; and
   d) delivering the transported air to a utilization means at said second location 34. A method according to claim 33 including the step of temporarily storing the compressed air.

35. A method according to claim 34 wherein the air is compressed and stored during a first interval of time and the transported air is expanded during a second interval of time.

36. A method for conditioning air comprising the steps of:
   a) compressing air at a first location;
   b) transporting the compressed air to a second location;
   c) expanding the transported air at the said second location;
   d) controlling the compression of air and expansion of air such that the air is compressed and prevented from expanding during a first interval of time and expanded and prevented from being compressed during a second interval of time different from the first interval of time; and
   f) delivering the transported air to a utilization means at said second location.

37. A method according to claim 36 including the step of temporarily storing the compressed air.

38. A method according to claim 36 wherein the air is compressed and stored during a first interval of time and the transported air is expanded during a second interval of time.

39. A method according to claim 36 wherein the expansion of the air at said second location releases energy that is converted into electrical power.

40. A method for conditioning air in a building comprising the steps of:
   a) compressing air at a first location remote from the building;
   b) transporting the compressed air to said building;
   c) expanding the transported air at said building; and
   d) delivering the expanded air to a utilization means;
   e) expanding the air in the utilization device to generate electricity; and
   f) delivering the expanded air to said building.

41. A method according to claim 40 including the step of temporarily storing the compressed air.

42. A method according to claim 41 wherein the air is compressed and stored during a first interval of time and transported air is expanded during a second interval of time.

43. A method according to claim 40 wherein the expansion of the air at said second location releases energy that is converted into electrical power.

44. A method for conditioning air comprising the steps of:
   a) compressing air at a first location;
   b) transporting compressed air to a second location remote from the first location;
   c) expanding the transported air at said second location;
   d) delivering the expanded air to one or more utilization means at said second location; and
   e) extracting heat from compressed air at the first location and converting some of the extracted heat to electrical power.

45. A method for conditioning air comprising the steps
   a) compressing air at a first location;
   b) transporting compressed air form the first location to a second location remote from the first location;
   c) expanding the transported air at said second location thereby releasing energy;
   d) delivering the expanded air to one or more utilization means at said second location; and
   e) converting the released energy at said second location into electrical power.

46. Apparatus for conditioning air comprising:
   a) compressor means at a first location for compressing air;
   b) pipeline means for transporting air from said first location to a second location;
   c) an expander at said second location for expanding the compressed air thereby releasing energy;
   d) utilization means for receiving expanded compressed air from said expander means; and
   e) a converter associated with said expander for converting the released energy into electrical power.

47. Apparatus according to claim 46 including heat exchanger means operatively associated with said compressor means for extracting heat from the air compressed by the latter.

48. Apparatus according to claim 47 including means responsive to extracted heat for generating electrical power.

49. Apparatus according to claim 48 wherein said last named means includes an organic fluid, Rankine cycle heat engine.

50. Apparatus according to claim 47 including turbo-generator means operatively associated with said heat exchanger means and responsive to heat extracted from the air for generating electrical power.

51. Apparatus according to claim 46 wherein said expander is in the form of a turbine, and said converter is in the form of a generator coupled to the turbine.

52. Apparatus according to claim 46 wherein said first location is on water, and the second location is on land.

53. Apparats according to claim 46 wherein said first location and said second location are on land.

* * * * *